United States Patent [19]

Ardon et al.

[11] Patent Number: 4,805,166
[45] Date of Patent: Feb. 14, 1989

[54] SWITCH PATH RESERVATION ARRANGEMENT

[75] Inventors: Menachem T. Ardon, Naperville; John P. Sassano, Wheaton, both of Ill.

[73] Assignee: American Telephone and Telegraph Company, AT&T Bell Laboratories, Murray Hill, N.J.

[21] Appl. No.: 115,068

[22] Filed: Oct. 28, 1987

[51] Int. Cl.$^4$ ............................................. H04Q 11/04
[52] U.S. Cl. ........................................... 370/54; 370/58
[58] Field of Search ..................... 370/54, 58, 94, 60, 370/59, 63, 64, 65; 178/3; 340/825, 825.03, 826; 379/165, 220, 258, 272, 276, 292

[56] References Cited

U.S. PATENT DOCUMENTS

| | | | |
|---|---|---|---|
| 3,391,252 | 7/1968 | Germanton | 179/18 |
| 3,643,032 | 2/1972 | Ulrich et al. | 179/18 |
| 3,860,761 | 1/1975 | O'Neill, Jr. | 179/18 |
| 3,909,786 | 9/1975 | Lawrence | 370/63 |
| 4,038,497 | 7/1977 | Collins et al. | 179/15 |
| 4,259,549 | 3/1981 | Stehman | 179/18 |
| 4,317,962 | 3/1982 | Cox et al. | 179/18 |
| 4,322,843 | 3/1982 | Beuscher et al. | 370/63 |
| 4,340,776 | 7/1982 | Ganz | 178/3 |
| 4,377,859 | 3/1983 | Dunning et al. | 370/58 |
| 4,392,221 | 7/1983 | Hesketh | 370/54 |
| 4,421,955 | 12/1983 | Mori et al. | 179/18 |
| 4,442,321 | 4/1984 | Stehman | 179/18 |
| 4,530,092 | 7/1985 | Hafer | 370/66 |
| 4,550,404 | 10/1985 | Chodrow et al. | 370/110.1 |
| 4,621,357 | 11/1986 | Naiman et al. | 370/58 |
| 4,644,528 | 2/1987 | Ahmad et al. | 370/58 |
| 4,720,854 | 1/1988 | Sand | 379/269 |

FOREIGN PATENT DOCUMENTS 0228204 7/1987 European Pat. Off. ....... H04Q/11
5414604 3/1979 Japan ................................. H04M/3

OTHER PUBLICATIONS

H. Takeda et al., "Time Division Switching Control System", *Review of the Electrical Communication Laboratories*, vol. 27, No. 9-10, Sep.-Oct. 1979, pp. 773-782.
G. Becker et al., "Call Processing in a Distributed Control System", *ICC '80 Conference Record*, vol. 3 of 3, Jun. 8-12, 1980, pp. 46.4.1-46.4.7.
D. Jackson and K. Patfield, "Impacts of Multiprocessing on GTD-5 EAX Call Processing and Operating System", ISS'81 CIC Montreal Sep. 21-25, 1981, pp. 1-7.
M. Akiyama et al., "Time Division Distributed Switching System", ISS'81 CIC Montreal Sep. 21-25, 1981, pp. 1-7.

*Primary Examiner*—Douglas W. Olms
*Assistant Examiner*—Wellington Chin
*Attorney, Agent, or Firm*—Ross T. Watland

[57] ABSTRACT

A switch path reservation arrangement where any paths that are established for calls between two switching modules are reserved such that most future calls between the two modules are set up promptly using previously reserved paths with a minimum of inter-module message communication. Relatively few calls require a path hunt involving inter-module negotiation to determine a new path. Such new path is not only assigned for the call but also thereafter reserved for calls between the two modules. Path reservations are changed only when required to avoid blocking a call. Thus, the path reservation arrangement adjusts the number of paths between modules on a per-call basis to dynamically match the call traffic load.

28 Claims, 8 Drawing Sheets

FIG. 4
RESERVATION/OWNERSHIP TABLE FOR SM 3000-N

| CHANNEL | RESERVED/ NONRESERVED | RESERVED TO SM 3000- | OWNED BY SM 3000- |
|---|---|---|---|
| TS 0 | 1 | 2 | N |
| TS 1 | 0 | - | N |
| TS 2 | 1 | 14 | 14 |
| TS 3 | 1 | 7 | N |
| TS 4 | 0 | - | N |
| ⋮ | ⋮ | ⋮ | ⋮ |
| TS 9 | 1 | 1 | N |
| ⋮ | ⋮ | ⋮ | ⋮ |
| TS 130 | 1 | 1 | N |
| ⋮ | ⋮ | ⋮ | ⋮ |
| TS 160 | 1 | 1 | 1 |
| ⋮ | ⋮ | ⋮ | ⋮ |
| TS 202 | 1 | 1 | N |
| ⋮ | ⋮ | ⋮ | ⋮ |
| TS 390 | 1 | 1 | 1 |
| ⋮ | ⋮ | ⋮ | ⋮ |
| TS 410 | 1 | 1 | N |
| ⋮ | ⋮ | ⋮ | ⋮ |
| TS 511 | 1 | 7 | 7 |

FIG. 5
CALL ASSIGNMENT TABLE FOR SM 3000-N

| CALL ID | ASSIGNED CHANNEL |
|---|---|
| 1 | TS 14 |
| 2 | TS 191 |
| 3 | TS 64 |
| 4 | TS 490 |
| ⋮ | ⋮ |

FIG. 4
RESERVATION/OWNERSHIP TABLE FOR SM 3000-N

| CHANNEL | RESERVED/ NONRESERVED | RESERVED TO SM 3000- | OWNED BY SM 3000- |
|---|---|---|---|
| TS 0 | 1 | 2 | N |
| TS 1 | 0 | - | N |
| TS 2 | 1 | 14 | 14 |
| TS 3 | 1 | 7 | N |
| TS 4 | 0 | - | N |
| ... | ... | ... | ... |
| TS 9 | 1 | 1 | N |
| ... | ... | ... | ... |
| TS 130 | 1 | 1 | N |
| ... | ... | ... | ... |
| TS 160 | 1 | 1 | 1 |
| ... | ... | ... | ... |
| TS 202 | 1 | 1 | N |
| ... | ... | ... | ... |
| TS 390 | 1 | 1 | 1 |
| ... | ... | ... | ... |
| TS 410 | 1 | 1 | N |
| ... | ... | ... | ... |
| TS 511 | 1 | 7 | 7 |

FIG. 5
CALL ASSIGNMENT TABLE FOR SM 3000-N

| CALL ID | ASSIGNED CHANNEL |
|---|---|
| 1 | TS 14 |
| 2 | TS 191 |
| 3 | TS 64 |
| 4 | TS 490 |
| ... | ... |

FIG. 6
BIT MAP X FOR SM 3000-N

| 0 | 1 | 2 | 3 | 4 | | 511 |
|---|---|---|---|---|---|---|
| 1 | 0 | 1 | 1 | 1 | . . . . . . . . . . . . . | 1 |

0 - NONRESERVED AND IDLE
1 - OTHERWISE

FIG. 7
BIT MAP Y FOR SM 3000-N

| 0 | 1 | 2 | 3 | 4 | | 511 |
|---|---|---|---|---|---|---|
| 0 | 0 | 1 | 1 | 0 | . . . . . . . . . . . . . | 1 |

0 - OWNED BY SM 3000-N AND IDLE
1 - OTHERWISE

FIG. 8
BIT MAP Z FOR SM 3000-N

| 0 | 1 | 2 | 3 | 4 | | 511 |
|---|---|---|---|---|---|---|
| 0 | 0 | 0 | 0 | 0 | . . . . . . . . . . . . . | 1 |

0 - IDLE
1 - BUSY

SWITCH PATH RESERVATION ARRANGEMENT

CROSS-REFERENCE TO RELATED APPLICATIONS

This application is related to the application of M. T. Ardon and J. P. Sassano, Case 5-2, "Communication Channel Ownership Arrangement", filed concurrently herewith and assigned to the assignee of the present invention.

BACKGROUND AND PROBLEM

Stored program controlled switching systems have traditionally included a central computer that controlled switching functions in reponse to a program stored in memory. Although recent switching systems have distributed the call processing function among a number of system control units, many of the time-consuming tasks involved in call setup are still typically performed by a central control. For example, in one known digital switching system, the switching function is distributed among a plurality of switching modules. Each switching module has a plurality of ports and provides connections among the lines and trunks connected to the ports of that module. Calls involving lines or trunks connected to different modules are completed through a time-multiplexed switch that interconnects the modules. Each switching module includes a control unit that controls the switching function of that module. The system also includes a central control that controls the switching function of the time-multiplexed switch. Call handling in such systems requires the execution of a number of functions in addition to establishing connections. Although many of the real-time intensive tasks associated with calls, e.g., signal processing, are performed by the switching module control units, others, notably the determination of the identity of the terminating port of the switching system for each call and the path hunting required to select an available path through the time-multiplexed switch, are performed by the system central control.

One of the important advantages of a modular system of this type is that its capacity can be closely matched to the requirements of specific applications. However, as the system becomes larger and the number of switching modules increases, the performance of per-call tasks by the system central control imposes an upper limit on the overall system call processing capacity. Even when the terminating port determination function is distributed to the switching module control units, the performance of the path hunt function by the system central control undesirably limits system call processing capacity and still requires the involvement of the system central control in setting up individual telephone calls. Accordingly, the computer used as the system central control must be very reliable since a failure of that computer results in a loss of service to all the system customers. Of course each computer reliability requirements typically translate into a higher overall system cost, as for example, when duplicated, high reliability central computers are provided.

U.S. Pat. No. 4,644,528, issued to M. Ahmad et al. on Feb. 17, 1987, discloses a distributed control switching system having a central switching stage that can connect each of the channels from a given switching module to a corresponding channel from any of the other switching modules. Each of the system switching modules stores information defining the busy/idle status of the channels between that switching module and the central switching stage. The two switching modules involved in an inter-module call negotiate to select the path through the central switching stage by selecting corresponding idle channels associated with the two modules without involving a system central control. Although the Ahmad distributed system avoids the involvement of a central control in per-call tasks, the negotiation required between modules in performing a new path hunt for every inter-module call undesirably increases both the module call processing load and the control message traffic between modules, thus limiting the call capacity improvement otherwise attainable. In addition, for most calls the negotiation results in an increased postdialing delay.

In view of the foregoing, a recognized problem in the art is the inefficiency of call processing arrangements requiring inter-module path hunt negotiation for each and every inter-module call.

Solution

The foregoing problem is solved and a technical advance is achieved in accordance with the principles of the invention in an exemplary arrangement where any paths that are established for calls between two switching modules are advantageously reserved such that most future calls between the two modules are set up promptly using previously reserved paths with a minimum of inter-module message communication. Relatively few calls require a path hunt involving inter-module negotiation to determine a new path. Such new path is not only assigned for the call but also thereafter reserved for calls between the two modules. Path reservations are changed only when required to avoid blocking a call. Thus, the path reservation arrangement adjusts the number of reserved paths between modules in a per-call basis to dynamically match the call traffic load. Although particularly useful in distributed systems, the path reservation arrangement of the invention may also be used by a single central control for rapid global assignment of switch paths to calls.

Figure 1:
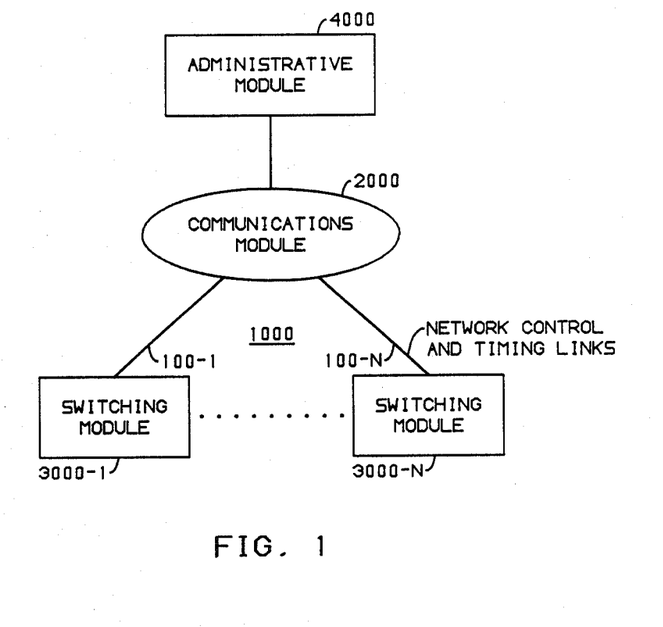
FIG. 1 is a block diagram of an illustrative switching system implementing the present invention.

An illustrative call processing method in accordance with the invention is used in the arrangement including a number of call units (switching modules in FIG. 1) for each communicating in an associated plurality of channels, and a switch (communication module in FIG. 1) that provides switched connections among the call units such that each of the channels associated with any given call unit is connectable with a corresponding channel associated with any other call unit. A call between first and second call units is processed by first determining whether there is a channel associated with the first call unit that is presently idle and reserved for connecting the first and second call units, and that has a corresponding channel associated with the second call unit that is also presently idle and reserved for connecting the first and second call units. If such idle, reserved channel is found, it and a corresponding channel associated with the second call unit are assigned for the call. If no channel is found meeting the stated criteria, processing of the call continues by determining whether there is a channel associated with the first call unit that is presently idle and not reserved for connecting the first and second call units and that has a corresponding channel associated with the second call unit that is also presently idle and not reserved for connecting the first and second call units. When no channel is found, the call is blocked. However, when a channel is found, the switch establishes a connection between that channel and a corresponding channel associated with the second call unit, and such channels are assigned for the call and reserved for connecting the first and second call units. Upon completion of the call, the switch retains the established connection for future calls between the first and second call units.

DRAWING DESCRIPTION

FIG. 3 is a block diagram of the system of FIG. 1 with a switching module of the system shown in more detail;

DETAILED DESCRIPTION

Switching system 1000 (FIG. 1) has three major components: an administrative module (AM) 4000 that provides systemwide administration, maintenance, and resource allocation; a communications module (CM) 2000 that provides a hub for distributing and switching voice or digital data, control information, and synchronization signals; and a number of switching modules (SMs) 3000-1, 3000-N that perform local switching and control functions and that provide interfaces to subscriber lines and interexchange circuits.

AM 4000 provides the system-level interfaces required to operate, administer, and maintain system 1000. It performs functions that can most economically be done globally, such as common resource allocation and maintenance control. For reliability, AM 4000 includes fully duplicated processors and the two processors work in an active/standby configuration. In normal operation the active processor has control and, at the same time, keeps the data in the standby processor up to date. Thus when a fault occurs in the active processor, the standby processor is switched into service with no loss of data.

AM 4000 performs many call-processing support functions, including systemwide craft maintenance access, diagnostic and exercise control and scheduling, software recovery and intialization, and certain fault-recovery and error-detection functions best done on a centralized basis. Within AM 4000, there is error-checking circuitry for detecting and isolating faults. AM 4000 also performs administrative functions and provides software access to external data links and to disk storage (not shown).

Figure 2:
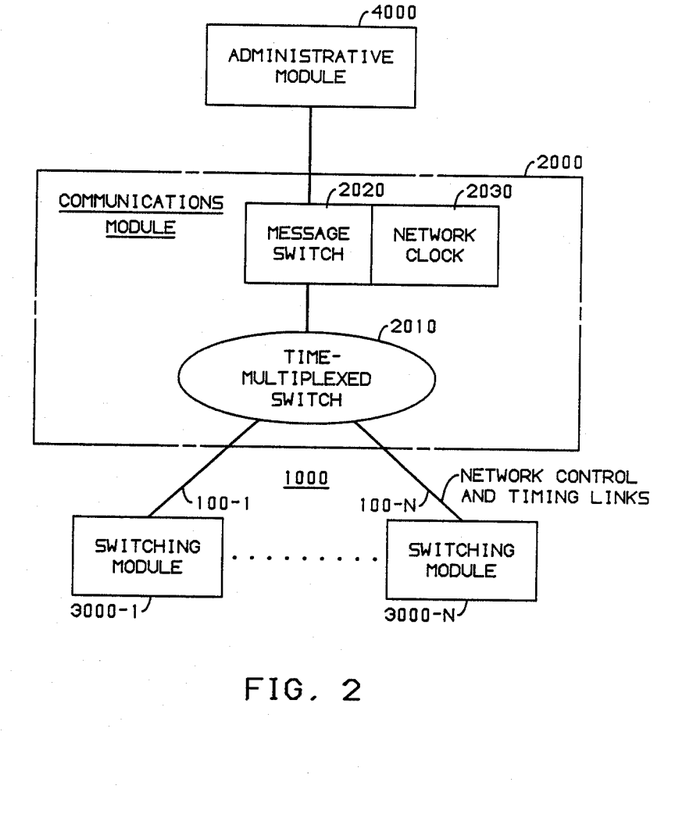
FIG. 2 is a block diagram of the system of FIG. 1 with a communications module of the system shown in more detail.

The basic function of CM 2000 (FIG. 2) is to provide consistent communications between the SMs, and between AM 4000 and the SMs. A message switch (MSGS) 2020 transfers call-processing and administrative messages between the SMs and AM 4000, and between any two SMs. MSGS 2020 performs a packet-switching function within system 1000 utilizing the well-known X.25 level-2 protocol to transfer control messages through CM 2000 and its terminating network control and timing (NCT) links 100-1, 100-N. This protocol includes error detection, positive message acknowledgment, and message retransmission in the event of a transmission error. A network clock 2030 provides the clock signals that synchronize the time-division network. Clock 2030 is synchronized through an external source or runs on an internal reference basis with periodic updating.

System 1000 uses a time-space-time architecture. As illustrated in FIG. 3, a time-slot interchange unit (TSIU) in each SM performs the time-division switching; a time-multiplexed switch (TMS) 2010 in CM 2000 (FIG. 2) performs the time-shared space-division switching. At each interface unit (FIG. 3) the outputs from lines and trunks are converted into 16-bit time slots. These bits are used for signaling, control, and parity, and for binary-coded voice or data. The time slots are switched through the TSIU and time-multiplexed on NCT links to TMS 2010.

TMS 2010 (FIG. 2) is a single-stage switching network that provides the digital paths for switched connections between the modules and for control messages among modules. TMS 2010 interconnects the modules via the NCT links. Each NCT link carries 256 channels (time slots) of multiplexed data in a 32.768-Mb/s serial bit stream. One of the time slots carries control messages, and the remaining 255 time slots carry digitized voice or data. Two NCT links are associated with each switching module, thus allowing 512 time slots to be routed to and from TMS 2010. (However, only a single line 100-1 is shown in the drawing to represent both NCT links between SM 3000-1 and CM 2000.) Setting up a path between a line or trunk on two SMs involves finding an idle time slot on one of the NCT links to each SM. A path is then set up through TMS 2010 between the two NCT links using the selected time slot. The TSIU in each SM establishes a path between the selected NCT time slot and the peripheral time slot associated with the line or trunk. (Since the paths are bidirectional, one NCT time slot is needed for each direction of transmission. In the present embodiment however, the time slots for the two directions are selected to have the same number.)

One of the signaling bits of the 16-bit time slots on the NCT links to TMS 2010, referred to as the E-bit, is used for continuity verification between SMs after an inter-SM call has been set up through TMS 2010. For example, after a call between SM 3000-1 and SM 3000-N has been set up through TMS 2010 using a particular time slot, both SM 3000-1 and SM 3000-N begin transmitting a logic one E-bit in the particular time slot as a continuity signal and both also begin scanning the E-bit of the particular time slot received from the other SM. The call setup procedure is not considered complete until both SM 3000-1 and SM 3000-N have detected the E-bit continuity signal from the other SM.

SMs such as SM 3000-1 (FIG. 3) provide call-processing intelligence, the first stage of switching network, and line and trunk terminals. SMs differ in the types and quantities of interface equipment they contain, depending upon the characteristics of the lines or trunks terminating thereon. Certain equipment is however, common to all SMs. The common equipment includes a link interface 3030, a TSIU 3010, and a module control unit 3020. Link interface 3030 provides a two-way interface between each SM and TMS 2010 in CM 2000. Module control unit 3020 controls call processing, call distribution, and maintenance functions. A variety of interface units 3041, 3042 are available in system 1000. Line units provide interfaces to analog lines. Trunk units provide interfaces to analog trunks. Digital line trunk units provide interfaces to digital trunks and remote SMs, while digital carrier line units provide the interface to digital carrier systems. Integrated services line units provide interfaces to digital ISDN lines. Each SM can accommodate any mixture of these units, with up to 510 channels. Two time slots are used for control.

TSIU 3010 includes a signal processor, which handles address and signaling information and a control interface, which distributes control signals to and from the interface units. TSIU 3010 switches time slots between the interface units in an SM and connects time slots from the interface units to time slots on NCT links. TSIU 3010 switches 512 time slots—256 from each of the NCT links between SM 3000-1 and CM 2000—and 512 peripheral time slots from the interface units. TSIU 3010 can connect any of its 512 peripheral time slots to any other peripheral time slot, or to any time slot of either NCT link to CM 2000.

Recall that there are 512 channels (time slots) TS0 through TS511 between a given SM and TMS 2010 (FIG. 2) and that setting up a path for an inter-module call between SM 3000-1 and SM 3000-N involves finding a channel that is idle on link 100-1, for example TS44, and that has a corresponding idle channel TS44 on link 100-N. Each SM stores information defining the status of the channels between that SM and TMS 2010. After an inter-module call is over, the corresponding channels are marked idle in the two SMs, but the two SMs agree to reserve the corresponding channels for future calls between themselves. The corresponding channels together with the TMS 2010 connection between them comprise a reserved path between the two SMs. In most cases, reserved paths can be used for subsequent calls thus avoiding the hunting of new paths and the associated exchange of messages between SMs. The path reservations are dynamic in that they are adjusted by the SMs as traffic patterns change.

Each reserved bidirectional path between two SMs has one of the SMs defined as the owner. Ownership is defined to circumvent glare conditions that would otherwise develop from two SMs attempting to use the same reserved path at approximately the same time. An owning SM may use a reserved path without negotiating with the non-owner SM at the other end. The non-owner must ask the owner to relinquish ownership before the non-owner can use the reserved path.

By virtue of its ownership of a reserved path, an SM owns the channels included in such reserved path. An SM also owns any of the channels TS0 through TS511 between that SM and TMS 2010 that are not reserved—the SM can assign non-reserved channels to calls without negotiating with any other SM.

If no reserved path is idle between the originating and terminating SMs for a call, a new path between the two SMs must be negotiated. The negotiation begins by a first SM sending a copy of its map of idle time slots to the second SM which compares this map with its own map of idle time slots to find a common time slot that is idle in both SMs. The first SM must be informed of the results of the path hunt, the TMS 2010 connection must be made, and E-bit continuity must be sent and received at each end before the path is considered complete.

Whenever a new path is hunted, the time slot that is selected may be currently assigned to a reserved path going to a different SM. This conflict can occur at either end of the new path or at both ends. In each case, the existing reserved path must be removed and its time slot reassigned to a new path. The procedure for removing the reserved path depends on whether the initiating SM is the owner or not. If the owning SM wants to remove the reserved path, it may immediately do so, but a message must be sent to the non-owning SM to notify it that the time slot should be released at its end. If the non-owning SM wants to remove the reserved path, it must first send a message to the owning SM to request a release of the reserved path. If the owning SM returns an acknowledgement message giving consent, the non-owning SM can use this time slot knowing that the owning SM has already released the reserved path.

Figure 4:
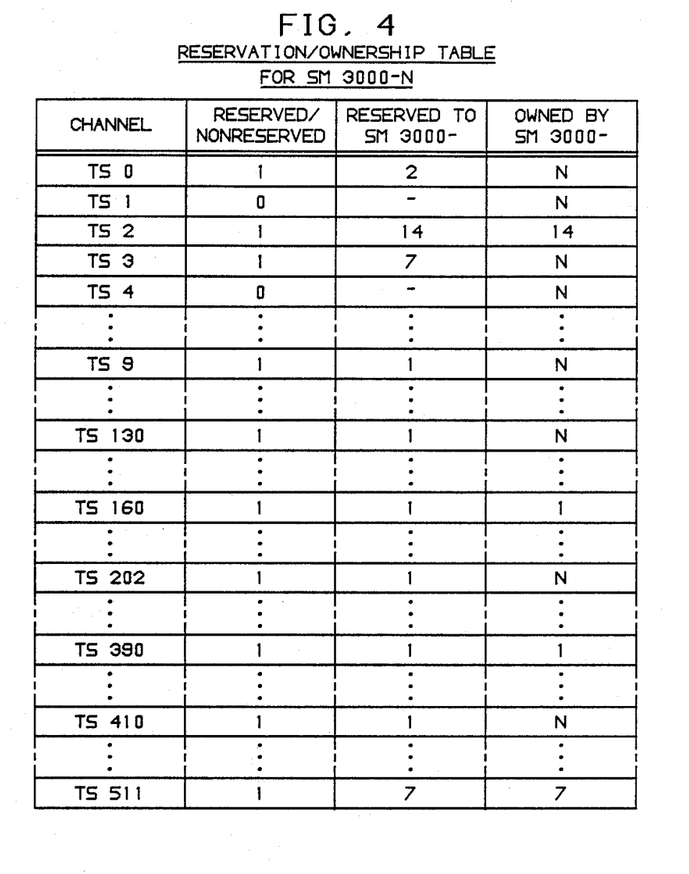
FIGS. 4 through 8 show various data structures stored in one of the switching modules of the system of FIG. 1 for use in implementing the present invention.
Figure 5:
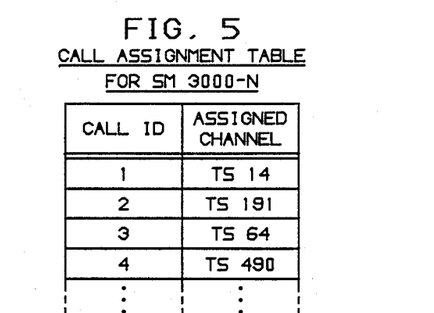
Figure 6:
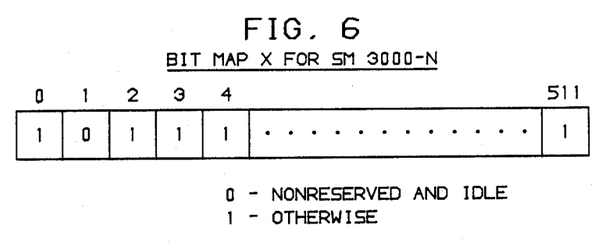
Figure 7:
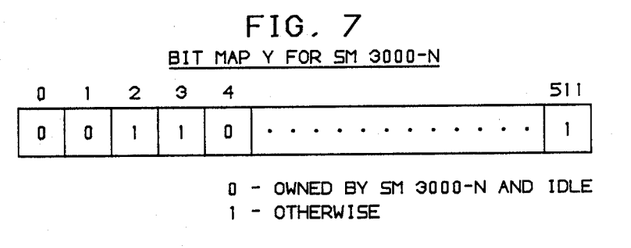
Figure 8:
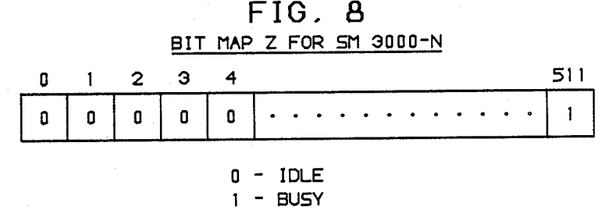

Each SM stores information concerning its 512 associated channels TS0 through TS511 in a memory in its module control unit. The stored information includes a reservation/ownership table, a call assignment table, and three bit maps X, Y, and Z. The reservation ownership table for SM 3000-N is shown in FIG. 4. The table defines the following for each of the channels TS0 through TS511: 1. whether the channel is reserved (1) to any SM or non-reserved (O); 2. for reserved channels, which SM the channel is reserved to; and 3. which SM is the owner of the channel. Note that in the table of FIG. 4, there are six reserved paths between SM 3000-1 and SM 3000-N, two owned by SM 3000-1 and four owned by SM 3000-N. The call assignment table for SM 3000-N is shown in FIG. 5. The table defines the network time slot or channel assigned to each active call to or from that SM. The bit maps X, Y, and Z for SM 3000-N are shown in FIGS. 6, 7, and 8. Each bit map comprises 512 bits, one for each of the 512 channels TS0 through TS511. In bit map X, a zero indicates that a channel is presently not reserved to any SM and idle. In bit map Y, a zero indicates that a channel is presently owned by SM 3000-N (either not associated with a reserved path or, if it is part of a reserved path, it is owned by SM 3000-N) and idle. In bit map Z, a zero indicates that a channel is presently idle.

Figure 9:
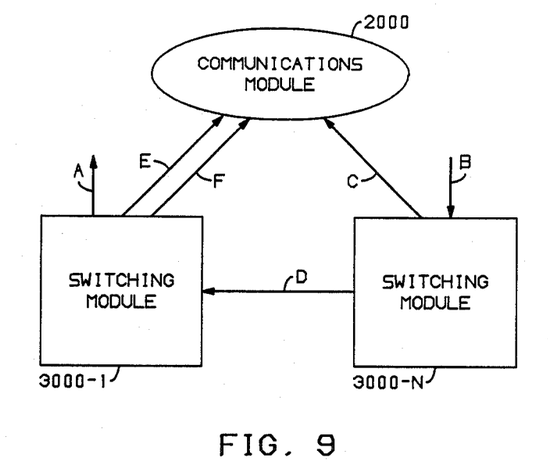
FIGS. 9 through 13 are functional control message diagrams corresponding to five call processing examples illustrating the path reservation arrangement of the system of FIG. 1.

Five examples illustrating the setup of inter-module calls between SMs 3000-1 and 3000-N are described hereafter. The examples illustrate five phases that call processing goes through if each successive phase is unsuccessful in finding a path for the call. FIG. 9 illustrates the first example. A call request is originated from a line served by SM 3000-1. SM 3000-1 transmits a route request message (A) to one of the other SMs (not shown) that serves as the routing module for the particular directory number that was called. The routing module performs the translation of the directory number and determines that the call is to be terminated to a line served by SM 3000-N. The routing module then transmits a termination request message (B) to SM 3000-N. SM 3000-N checks its reservation/owernship table and bit map Z to determine whether it owns an idle reserved path between SM 3000-N and SM 3000-1. If it does, the channel is marked busy in the bit maps X, Y, and Z and assigned to the call in the call assignment table (FIG. 5). SM 3000-N sends E-bit continuity (C) to CM 2000 and begins E-bit scanning. The network time slot chosen for the call is then used to transmit audible ring. The identity of the chosen network time slot is passed to SM 3000-1 in a setup completion message (D).

SM 3000-1 marks the time slot busy in its bit maps X, Y, and Z, and proceeds with path setup by sending a connect order message (E) to CM 2000. SM 3000-1 also sends E-bit continuity (F) to CM 2000, begins E-bit scanning, and closes the path through its TSIU to the appropriate peripheral time slot.

Figure 10:
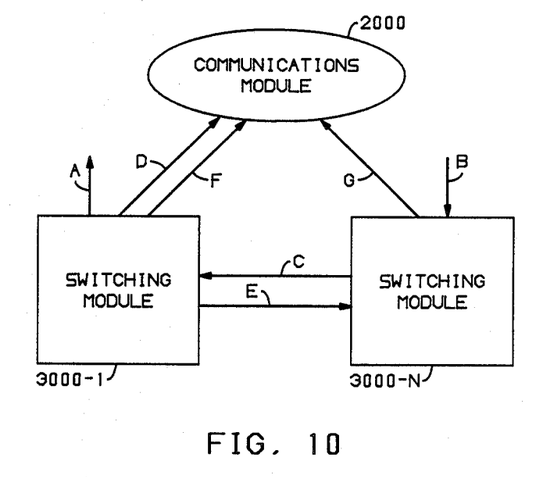

FIG. 10 illustrates a second example. The route request message (A) and the termination request message (B) are transmitted as before. SM 3000-N checks its reservation/ownership table and bit map Z to determine whether it owns an idle reserved path between SM 3000-N and SM 3000-1. In this example, all of the idle reserved paths between SM 3000-N and SM 3000-1 are owned by SM 3000-1. SM 3000-N selects one of the reserved paths owned by SM 3000-1 and marks it busy and assigned for the call subject to confirmation from SM 3000-1. The call proceeds similarly but SM 3000-N does not send E-bit continuity immediately since the same reserved path may be selected by SM 3000-1 for another call at about the same time. SM 3000-N sends a setup completion message (C) to SM 3000-1. In response, SM 3000-1 sends a connect order message (D) to CM 2000, closes the path through its TSIU, and sends a confirmation message (E) to SM 3000-N to confirm that SM 3000-1 has given up ownership of the reserved path. SM 3000-1 also sends E-bit continuity (F) and begins E-bit scanning. After receiving the confirmation message (E), SM 3000-N transmits E-bit continuity (G), and begins E-bit scanning. It is highly improbable that SM 3000-1 would deny the request of SM 3000-N for ownership; however, if it does, call processing proceeds to the next phase.

Figure 11:
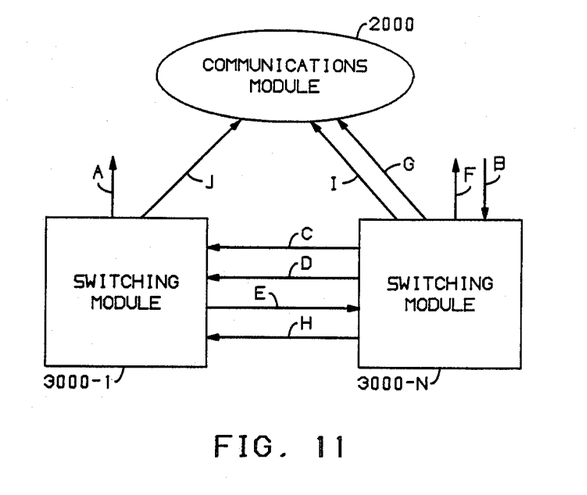

FIG. 11 illustrates the third example. The route request message (A) and the termination request message (B) are transmitted as before. However, in this example, SM 3000-N checks its reservation/ownership table and bit map Z and determines that there are no idle reserved paths between SM 3000-N and SM 3000-1. SM 3000-N then transmits a time slot map message (C), including its bit map Y, to SM 3000-N. Recall that bit map Y defines the idle owned time slots. The time slot map message (C) is transmitted to SM 3000-N prior to transmission of a setup completion message (D).

When SM 3000-1 receives the time slot map message (C), it looks for a match (corresponding zeros) between its bit map X (nonreserved and idle time slots) and the bit map Y for SM 3000-N included in the message. If a match is found, SM 3000-1 sends a new reserved path message (E) to SM 3000-N defining the network time slot that is to be reserved for connecting SM 3000-1 and SM 3000-N. By the time the new reserved path message is received by SM 3000-N, it is possible that the time slot has been chosen for a different new reserved path from SM 3000-N and is now busy. If this occurs the transmission of the time slot map message to SM 3000-1 and the matching between the bit map Y included in the message and the bit map X of SM 3000-1 is repeated.

If the chosen time slot defined by the new reserved path message (E) is idle and owned by SM 3000-N as part of a different reserved path to another SM, the other SM is notified via a message (F) that the previously reserved path between that SM and SM 3000-N is no longer reserved.

When the chosen time slot is accepted by SM 3000-N, a connect order message (G) is sent to CM 2000 such that the appropriate path is established through TMS 2010. SM 3000-N marks the time slot as busy and owned by SM 3000-N. SM 3000-N then returns a confirmation message (H) to SM 3000-1, begins transmitting E-bit continuity (I) to CM 2000, and begins E-bit scanning.

In response to the confirmation message (H), SM 3000-1 transmits E-bit continuity (J) to CM 2000 and begins E-bit scanning. SM 3000-N will receive the E-bit continuity to complete call setup.

Figure 12:
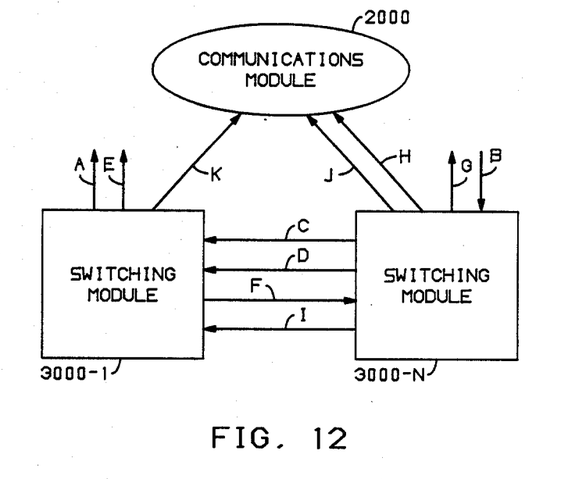

FIG. 12 illustrates the fourth example. The route request message (A) and the termination request message (B) are transmitted as before. SM 3000-N checks its reservation/ownership table and bit map Z and determines that there are no idle reserved paths between SM 3000-N and SM 3000-1. SM 3000-N then transmits a time slot map message (C), including its bit map Y, to SM 3000-N. The time slot map message (C) is transmitted to SM 3000-N prior to transmission of a setup completion message (D).

When SM 3000-1 receives the time slot map message (C), it looks for a match between its bit map X (nonreserved and idle time slots) and the bit map Y for SM 3000-N included in the message. In accordance with the fourth example, no match is found. SM 3000-1 then looks for a match between its bit map Y (owned and idle time slots) and the bit map Y for SM 3000-N. If a match is found and the chosen time slot is part of a reserved path to another SM, the other SM is notified via a message (E) that the previously reserved path between that SM and SM 3000-1 is no longer reserved. SM 3000-1 sends a new reserved path message (F) to SM 3000-N defining the network time slot that is to be reserved for connecting SM 3000-1 to SM 3000-N.

If the chosen time slot defined by the new reserved path message (F) is idle and owned by SM 3000-N as part of a different reserved path to another SM, the other SM is notified via a message (G) that the previously reserved path between that SM and SM 3000-N is no longer reserved.

When the chosen time slot is accepted by SM 3000-N, a connect order message (H) is sent to CM 2000 such that the appropriate path is established through TMS 2010. SM 3000-N marks the time slot as busy and owned by SM 3000-N. SM 3000-N then returns a confirmation message (I) to SM 3000-1, begins transmitting E-bit continuity (J) to CM 2000, and begins E-bit scanning.

In response to the confirmation message (I), SM 3000-1 transmits E-bit continuity (I) to CM 2000 and begins E-bit scanning. SM 3000-N will receive the E-bit continuity to complete call setup.

Figure 13:
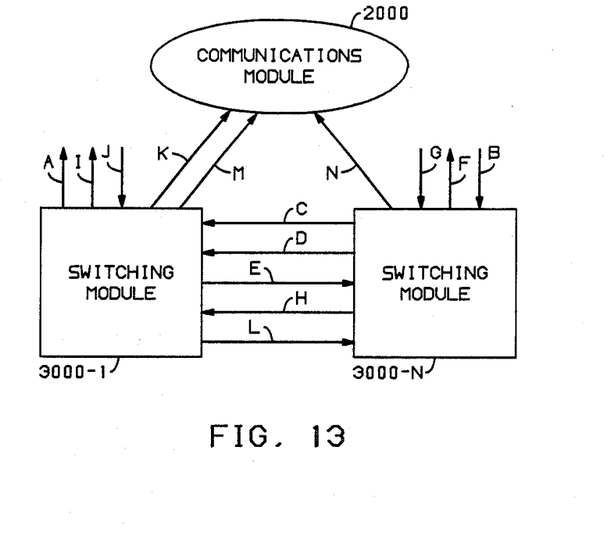

FIG. 13 illustrates the fifth example. The route request message (A) and the termination request message (B) are transmitted as before. SM 3000-N checks its reservation/ownership table and bit map Z and determines that there are no idle reserved paths between SM 3000-N and SM 3000-1. SM 3000-N then transmits a time slot map message (C), including its bit map Y, to SM 3000-N. The time slot map message (C) is transmitted to SM 3000-N prior to transmission of a setup completion message (D).

When SM 3000-1 receives the time slot map message (C), it looks for a match between its bit map X (nonreserved and idle time slots) and the bit map Y for SM 3000-N included in the message. No match is found. SM 3000-1 then looks for a match between its bit map Y (owned and idle time slots) and the bit map Y for SM 3000-N. In accordance with the fifth example, again no match is found. At this point, SM 3000-1 transmits a time slot map message (E) including its bit map Z (all idle time slots) to SM 3000-N. When SM 3000-N receives the time slot map message (E), it looks for a match between its bit map Z and the bit map Z for SM 3000-1 included in the message. If no match is found, the call is blocked. If a match is found, the chosen time slot is likely to be part of a reserved path to another SM. If this reserved path is not owned by SM 3000-N, ownership must first be reversed before the time slot can be accepted. This involves sending a message (F) and waiting for an acknowledgement message (G) from the other SM. If the chosen time slot is part of a reserved path that is owned by SM 3000-N, the other SM need only be notified and no acknowledgement message is necessary. SM 3000-N sends a new reserved path message (H) to SM 3000-1 defining the network time slot that is to be reserved for connecting SM 3000-1 and SM 3000-N.

The chosen time slot defined by the new reserved path message (H) is likely to be part of a reserved path between SM 3000-1 and another SM. If this reserved path is not owned by SM 3000-1, ownership must first be reversed before the time slot can be accepted. This involves sending a message (I) and waiting for an acknowledgement message (J) from the other SM. If the chosen time slot is part of a reserved path that is owned by SM 3000-1, the other SM need only be notified and no acknowledgement message is necessary.

When the chosen time slot is accepted by SM 3000-1, a connect order message (K) is sent to CM 2000 such that the appropriate path is established through TMS 2010. SM 3000-1 marks the time slot as busy and owned by SM 3000-1. SM 3000-1 then returns a confirmation message (L) to SM 3000-N, begins transmitting E-bit continuity (M) to CM 2000, and begins E-bit scanning.

In response to the confirmation message (L), SM 3000-1 transmits E-bit continuity (N) to CM 2000 and begins E-bit scanning. SM 3000-1 will receive the E-bit continuity to complete call setup.

In the present embodiment, once a path has been established through TMS 2010 and reserved for connecting two SMs, the path is retained for future calls between those SMs until the reservation is removed to avoid blocking by TMS 2010. Therefore, the connect order message transmitted in the first two examples described above is not needed operationally to cause the path to be set up. The messages are transmitted however to enhance the integrity and maintainability of system 1000.

The bit map comparisons (Y against X, Y against Y, Z against Z) are performed in the order indicated so that the total number of reserved paths in system 1000 becomes neither too large, leaving few paths available, for example, for intra-module calls, or too small, thus requiring performance of a new path hunt for a high percentage of calls.

In addition to being useful with respect to reserved paths and channels through a switch, communication channel ownership and the dynamic adjustment of ownership on a per-call basis are also applicable to two-way trunks between switching systems.

What is claimed is:

1. In an arrangement comprising switch means for providing paths among a plurality of call means, a method of processing a call between first and second ones of said call means comprising
  (A) in response to a call request for said call, determining whether there is a path of said switch means that is presently idle and reserved for connecting said first and second call means,
  (B) upon determining a path in step (A), assigning for said call said path determined in step (A),
  (C) upon determining no path in step (A), determining whether there is a path of said switch means that is idle, and that is usable but not reserved for connecting said first and second call means, and
  (D) upon determining a path in step (C), assigning for said call said path determined in step (C).

2. A method in accordance with claim 1 further comprising
  (E) upon determining said path in step (C), reserving said path determined in step (C) for future calls between said first and second call means.

3. A method in accordance with claim 2 further comprising
  (F) removing the reservation of said path determined in step (C) to avoid blocking by said switch means.

4. In an arrangement comprising switch means for establishing paths among a plurality of call means, a method of processing a call between first and second ones of said call means comprising
  (A) in response to a call request for said call, determining whether there is a path of said switch means, established between said first and second call means, that is presently idle,
  (B) upon determining no path in step (A), said switch means establishing a path between said first and second call means, and
  (C) reserving said path established in step (B) for future calls between said first and second call means.

5. A method in accordance with claim 4 further comprising
  (D) removing the reservation of said path established in step (C) to avoid blocking by said switch means.

6. In an arrangement comprising a plurality of call means each for communicating in an associated plurality of channels and switch means for providing switched connections among said call means such that each of said channels associated with any given one of said call means is connectable with a corresponding one of said channels associated with any other one of said call means, a method of processing a call between first and second ones of said call means comprising
  (A) in response to said call, determining whether there is a channel associated with said first call means that is presently idle and reserved for connecting said first and second call means and that has a corresponding channel associated with said second call means that is also presently idle and reserved for connecting said first and second call means, and
  (B) upon determining no channel in step (A), determining whether there is a channel associated with said first call means that is presently idle and not reserved for connecting said first and second call means and that has a corresponding channel associated with said second call means that is also presently idle and not reserved for connecting said first and second call means.

7. A method in accordance with claim 6 further comprising
  (C) upon determining a channel in step (A), assigning for said call said channel determined in step (A) and a corresponding channel associated with said second call means.

8. A method in accordance with claim 7 further comprising
  (D) upon determining a channel in step (B), assigning for said call said channel determined in step (B) and a corresponding channel associated with said second call means.

9. A method in accordance with claim 8 further comprising
(E) upon determining said channel in step (B), reserving, for connecting said first and second call means, said channel determined in step (B) and a corresponding channel associated with said second call means.

10. A method in accordance with claim 9 further comprising
(F) upon determining said channel in step (B), said switch means establishing a connection between said channel determined in step (B) and a corresponding channel associated with said second call means.

11. A method in accordance with claim 10 further comprising
(G) upon completion of said call, said switch means retaining said established connection for further calls between said first and second call means.

12. A method in accordance with claim 10 further comprising
(G) upon completion of said call, said switch means removing said established connection.

13. A method in accordance with claim 10 wherein step (B) comprises
(B1) upon determining no channel in step (A), said first call means transmitting a message to said second call means defining idle ones of said channels associated with said first call means that are not reserved for connecting said first and second call means, and
(B2) said second call means determining whether there is a channel associated with said second call means that is presently idle and not reserved for connecting said first and second call means and that corresponds to one of said channels defined by said message.

14. A method in accordance with claim 6 further comprising
(C) upon determining a channel in step (B), assigning for said call said channel determined in step (B) and a corresponding channel associated with said second call means.

15. A method in accordance with claim 6 further comprising
(C) upon determining a channel in step (B), reserving, for connecting said first and second call means, said channel determined in step (B) and a corresponding channel associated with said second call means.

16. A method in accordance with claim 6 further comprising
(C) upon determining a channel in step (B), said switch means establishing a connection between said channel determined in step (B) and a corresponding channel associated with said second call means.

17. A method in accordance with claim 16 further comprising
(D) upon completion of said call, said switch means retaining said established connection for future calls between said first and second call means.

18. A method in accordance with claim 16 further comprising
(D) upon completion of said call, said switch means removing said established connection.

19. A method in accordance with claim 6 wherein step (B) comprises
(B1) upon determining no channel in step (A), said first call means transmitting a message to said second call means defining idle ones of said channels associated with said first call means that are not reserved for connecting said first and second call means, and
(B2) said second call means determining whether there is a channel associated with said second call means that is presently idle and not reserved for connecting said first and second call means and that corresponds to one of said channels defined by said message.

20. An arrangement comprising
a plurality of call means each for communicating during calls,
switch means for providing paths among said plurality of call means,
means for storing reservation and busy/idle status information for paths of said switch means, and
means, responsive to a call request for a call between first and second ones of said call means, for assigning for said call a first path of said switch means between said first and second call means, when said reservation and busy/idle status information indicates that said first path is presently idle and reserved for connecting said first and second call means, and for assigning for said call a second path of said switch means between said first and second call means, when said reservation and busy/idle status information indicates that no path of said switch means is presently idle and reserved for connecting said first and second call means and that said second path is presently idle but not reserved for connecting said first and second call means.

21. An arrangement in accordance with claim 20 further comprising
means for updating said reservation information upon assignment of said second path for said call to indicate that said second path is reserved for connecting said first and second call means.

22. An arrangement comprising
a plurality of call means each for communicating during calls,
switch means for providing paths among said plurality of call means,
means for storing reservation and busy/idle status information for paths of said switch means, and
means, responsive to a call request for a call between first and second ones of said call means when said reservation and busy/idle status information indicates that no path of said switch means is presently idle and reserved for connecting said first and second call means but that a path of said switch means between said first and second call means is presently idle and not reserved for connecting said first and second call means, for updating said reservation information to indicate that said last-mentioned path is now reserved for connecting said first and second call means.

23. An arrangement comprising
a plurality of call means each for communicating in an associated plurality of channels,
switch means for providing switched connections among said call means such that each of said channels associated with any given one of said call means is connectable with a corresponding one of said channels associated with any other one of said call means, means for storing reservation and busy/idle status information for channels associated with a first one of said call means and for channels associated with a second one of said call means, and means responsive to a call between said first and second call means for assigning for said call a first channel associated with said first call means and a corresponding channel associated with said second call means, when said reservation and busy/idle status information indicates that said first channel is presently idle and reserved for connecting said first and second call means, and for assigning for said call a second channel associated with said first call means and a corresponding channel associated with said second call means, when said reservation and busy/idle status information indicates that none of said plurality of channels associated with said first call means is presently idle and reserved for connecting said first and second call means and that said second channel is presently idle but not reserved for connecting said first and second call means.

24. An arrangement in accordance with claim 23 further comprising means for updating said reservation information, upon assignment of said second channel for said call, to indicate that said second channel and a corresponding channel associated with said second call means are reserved for connecting said first and second call means.

25. An arrangement in accordance with claim 24 further comprising means for controlling said switch means to establish a connection between said second channel and a corresponding channel associated with said second call means.

26. An arrangement in accordance with claim 25 wherein said controlling means controls said swich means to retain said established connection for future calls between said first and second call means.

27. An arrangement in accordance with claim 25 wherein said controlling means is responsive to completion of said call for controlling said switch means to remove said established connection.

28. An arrangement comprising a plurality of call means each for communicating in an associated plurality of channels, switch means for providing switched connections among said call means such that each of said channels associated with any given one of said call means is connectable with a corresponding one of said channels associated with any other one of said call means, means for storing reservation and busy/idle status information for channels associated with a first one of said call means and for channels associated with a second one of said call means, and means, responsive to a call between said first and second call means when said reservation and busy/idle status information indicates that none of said plurality of channels associated with said first call means is presently idle and reserved for connecting said first and second call means and that a channel associated with said first call means is presently idle but not reserved for connecting said first and second call means, for updating said reservation information to indicate that said last-mentioned channel and a corresponding channel associated with said second call means are now reserved for connecting said first and second call means.

* * * * *